United States Patent
Hercock

(10) Patent No.: US 9,845,769 B2
(45) Date of Patent: Dec. 19, 2017

(54) PLASTIC CORE BLOCKER DOOR

(71) Applicant: ROHR, INC., Chula Vista, CA (US)

(72) Inventor: Henry Hercock, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 522 days.

(21) Appl. No.: 14/704,889

(22) Filed: May 5, 2015

(65) Prior Publication Data
US 2016/0326985 A1   Nov. 10, 2016

(51) Int. Cl.
  *B63H 11/10*  (2006.01)
  *F02K 1/62*   (2006.01)
  *F02K 1/72*   (2006.01)

(52) U.S. Cl.
  CPC .............. *F02K 1/625* (2013.01); *F02K 1/72* (2013.01); *F05D 2260/96* (2013.01); *F05D 2300/43* (2013.01); *Y02T 50/672* (2013.01)

(58) Field of Classification Search
  CPC ........ F02K 1/625; F02K 1/72; F05D 2260/96; F05D 2300/43; Y02T 50/672
  See application file for complete search history.

(56) References Cited

U.S. PATENT DOCUMENTS

| | | | |
|---|---|---|---|
| 4,129,269 A * | 12/1978 | Fage | F02K 1/60 239/265.19 |
| 4,278,220 A | 7/1981 | Johnston et al. | |
| 4,485,970 A * | 12/1984 | Fournier | F02K 1/70 239/265.29 |
| 4,564,160 A * | 1/1986 | Vermilye | F02K 1/72 239/265.29 |
| 4,801,112 A * | 1/1989 | Fournier | F02K 1/72 239/265.29 |
| 4,826,106 A | 5/1989 | Anderson | |
| 4,852,805 A | 8/1989 | Vermilye | |
| 5,230,213 A * | 7/1993 | Lawson | F02K 1/563 244/110 B |
| 5,315,820 A | 5/1994 | Arnold | |
| 5,476,237 A | 12/1995 | Clarke | |
| 5,575,147 A * | 11/1996 | Nikkanen | F02K 1/625 239/265.29 |
| 5,806,302 A | 9/1998 | Cariola et al. | |
| 5,863,014 A * | 1/1999 | Standish | F02K 1/70 239/265.29 |

(Continued)

FOREIGN PATENT DOCUMENTS

| | | |
|---|---|---|
| EP | 0799376 | 3/2000 |
| EP | 1053175 | 9/2002 |

(Continued)

OTHER PUBLICATIONS

Extended European Search Report dated Jan. 11, 2017 in European Application No. 16168343.8.

*Primary Examiner* — Jesse Bogue
(74) *Attorney, Agent, or Firm* — Snell & Wilmer L.L.P.

(57) ABSTRACT

Disclosed herein is a blocker door for use in a thrust reverser portion of a nacelle. The blocker door includes a structural frame having a plurality of connected and crossing ribs. The blocker door also includes a front sheet positioned on an airflow side of and attached to the structural frame. The blocker door also includes at least one acoustic core positioned between the ribs of the structural frame and comprising a plastic material.

19 Claims, 8 Drawing Sheets

(56) References Cited

U.S. PATENT DOCUMENTS

| | | | |
|---|---|---|---|
| 5,927,647 A * | 7/1999 | Masters | F02K 1/72 |
| | | | 239/265.19 |
| 6,123,170 A | 9/2000 | Porte et al. | |
| 6,170,254 B1 | 1/2001 | Cariola | |
| 6,173,807 B1 | 1/2001 | Welch et al. | |
| 6,385,964 B2 * | 5/2002 | Jean | F02K 1/72 |
| | | | 239/265.29 |
| 8,876,018 B2 * | 11/2014 | Vauchel | B64D 29/06 |
| | | | 239/265.19 |
| 8,904,751 B2 | 12/2014 | Howarth et al. | |
| 2008/0083210 A1 | 4/2008 | Sternberger et al. | |
| 2012/0097761 A1 * | 4/2012 | Vache | F02K 1/72 |
| | | | 239/265.19 |
| 2013/0161415 A1 * | 6/2013 | Bellanger | F02K 1/72 |
| | | | 239/265.19 |
| 2013/0171407 A1 * | 7/2013 | Franzoi | F02C 7/045 |
| | | | 428/116 |
| 2013/0195635 A1 * | 8/2013 | Robertson, Jr. | F01D 11/122 |
| | | | 415/197 |
| 2014/0353399 A1 | 12/2014 | Stuart et al. | |
| 2015/0027629 A1 * | 1/2015 | Butler | G10K 11/172 |
| | | | 156/306.6 |

FOREIGN PATENT DOCUMENTS

| | | |
|---|---|---|
| WO | WO 2015/006445 | 1/2015 |
| WO | WO 2015/017492 | 2/2015 |

* cited by examiner

US 9,845,769 B2

PLASTIC CORE BLOCKER DOOR

FIELD

The present disclosure relates to thrust reversers for aircraft propulsion systems and, more particularly, to blocker doors of thrust reversers.

BACKGROUND

Gas turbine engine systems for modern aircraft often include a thrust reverser incorporated into a nacelle. The thrust reverser may redirect the flow of air through the nacelle in order to apply a reverse thrust to the aircraft. One style of thrust reverser includes a translating sleeve. The translating sleeve may translate aft to deploy blocker doors into the bypass air duct of a nacelle. The blocker doors may redirect air in the bypass air duct outward though a series of cascades which then turn the air forward, producing reverse thrust. The blocker doors typically may be hinged to the translating sleeve and coupled to the inner fixed structure via a drag link. As the translating sleeve translates aft, the drag link pulls the blocker doors inward, pivoting them into the bypass air duct.

In some existing thrust reversers, the blocker door includes acoustic treatment to help damp noise created by the propulsion system. In that case, thrust reverser blocker doors have been constructed as acoustic sandwich panels with a top skin, back skin, and a core layer, such as a honeycomb core, layered in between to create resonating chambers that cancel noise in a known manner.

In the past, acoustic sandwich panel blocker doors were constructed as bonded metallic structures. Today, they may be constructed using laminar composites for the skins, and aluminum foil, paper, or similar core for the core layer. But the construction methods can be expensive. Forming the skins using laminar composites may require autoclave curing. The core must be carefully trimmed and cut to shape. All of these operations require extensive time and capital-intensive equipment. A new construction method and design is needed to reduce the cost of acoustic blocker doors in a thrust reverser.

SUMMARY

Disclosed herein is a blocker door for use in a thrust reverser portion of a nacelle. The blocker door includes a structural frame having a plurality of connected and crossing ribs. The blocker door also includes a front sheet positioned on an airflow side of and attached to the structural frame. The blocker door also includes at least one acoustic core positioned between the ribs of the structural frame and comprising a plastic material.

Also disclosed is a blocker door for use in a thrust reverser portion of a nacelle. The blocker door includes a structural frame defining at least one hinge lug and a drag link housing and having a plurality of connected and crossing ribs. The blocker door also includes a front sheet coupled to the structural frame. The blocker door also includes at least one acoustic core positioned between the ribs of the structural frame.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
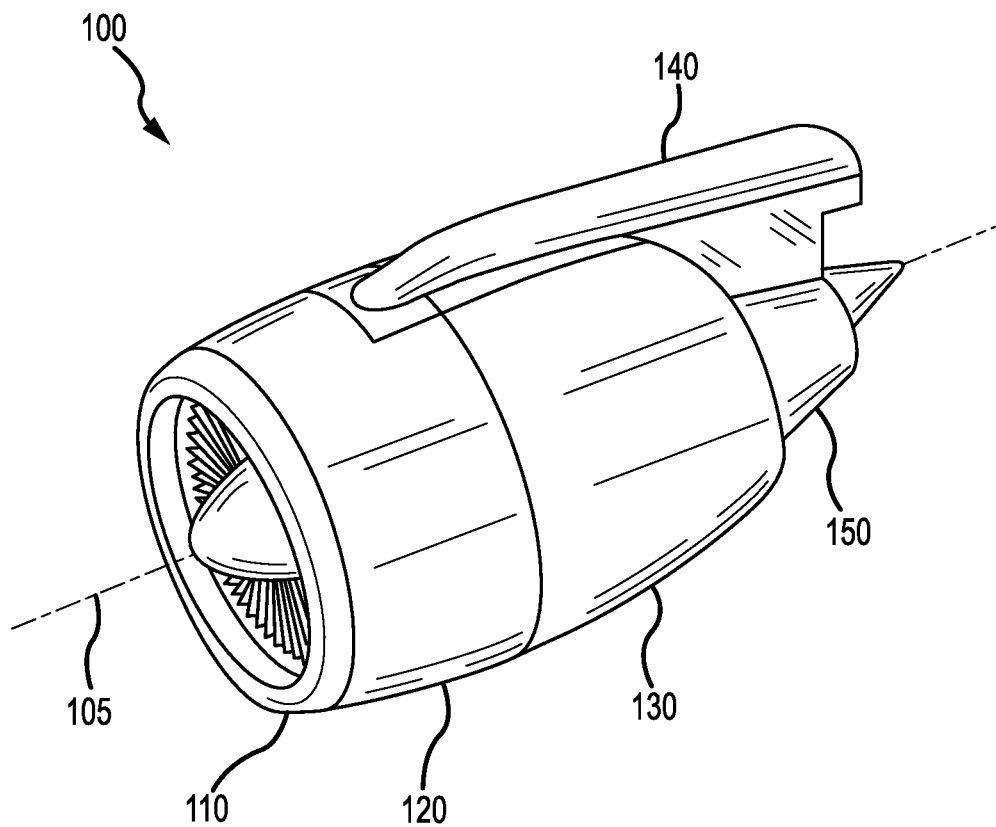
FIG. 1 illustrates a perspective view of a nacelle in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140 (only part of which is shown), which may mount the nacelle 100 to an aircraft wing or aircraft body. Nacelle 100 may further comprise an exhaust nozzle 150. The thrust reverser 130 may comprise a cascade-type thrust reverser, in which bypass air is directed through a cascade in order to apply a reverse thrust to an aircraft, such as during landing. The nacelle 100 may be disposed about a centerline 105, which may also be the axis of rotation of an engine located within the nacelle 100.

Figure 2:
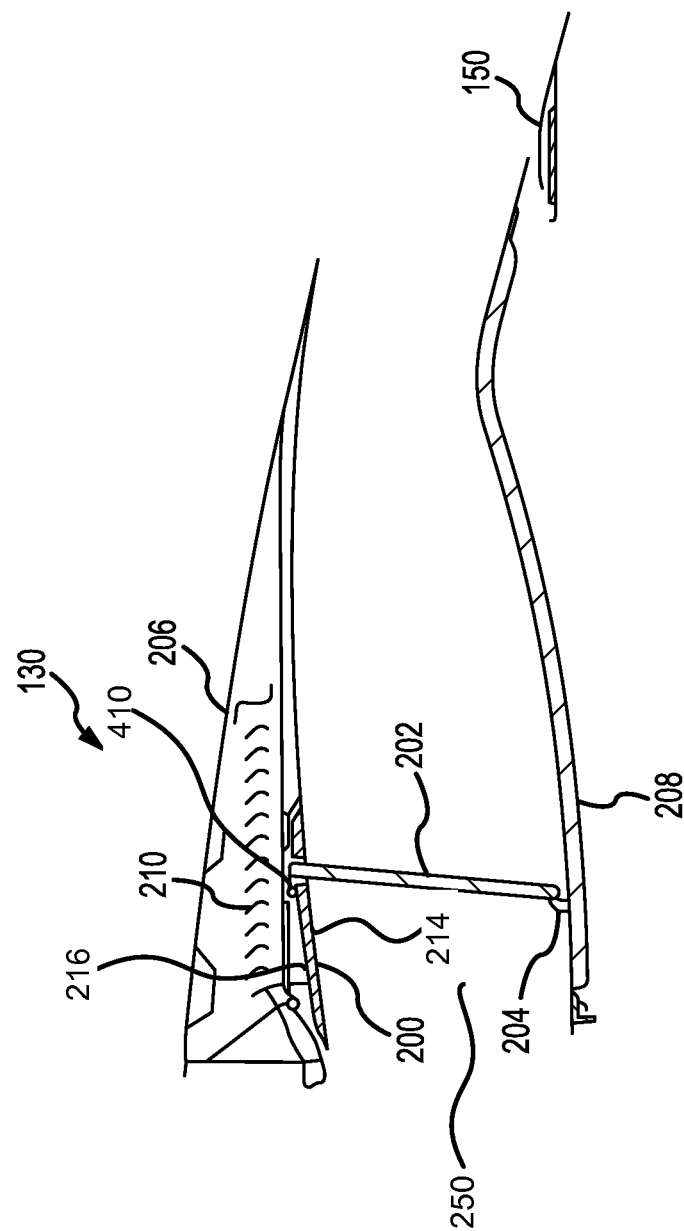
FIG. 2 illustrates a cross section of a thrust reverser of the nacelle of FIG. 1 in a forward-thrust configuration in accordance with various embodiments.
Figure 3:
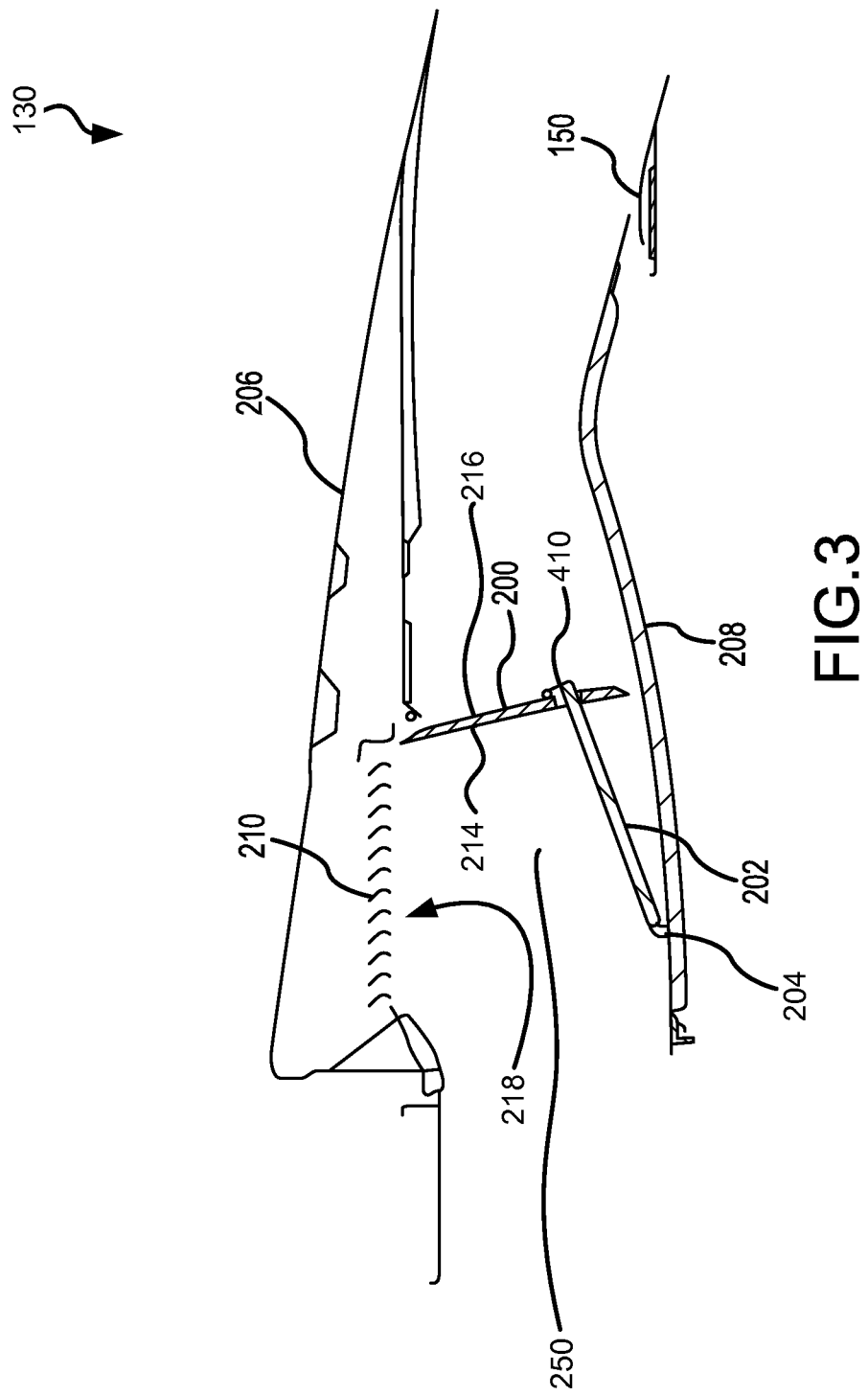
FIG. 3 illustrates a cross section of the thrust reverser of FIG. 2 in a reverse-thrust configuration in accordance with various embodiments.
Figure 4:
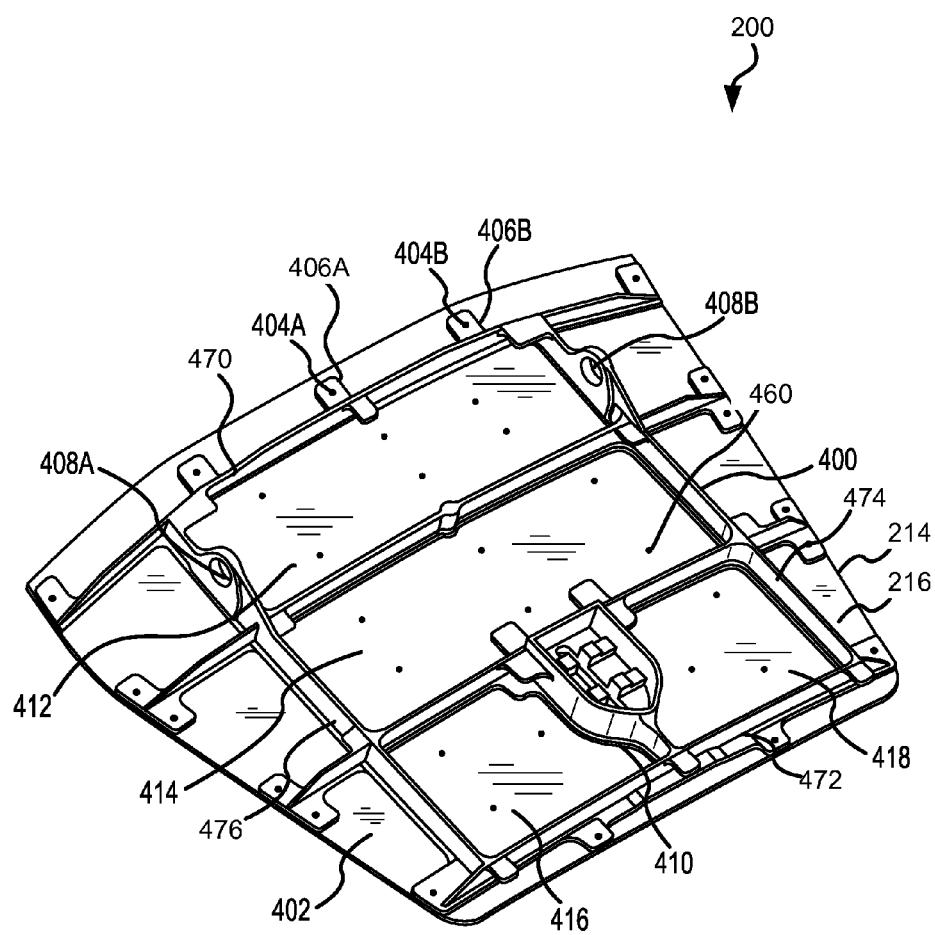
FIG. 4 illustrates a portion of a blocker door including a structural frame and a front sheet in accordance with various embodiments.

With reference now to FIGS. 2, 3 and 4, a portion of thrust reverser 130 is illustrated. A translating sleeve 206 is coupled to a blocker door 200 via hinges, such as hinge lugs 408A and 408B. Blocker door 200 includes an airflow side 214 and a non-airflow side 216. Airflow through thrust reverser 130 (i.e., flowing through a bypass air duct 250) contacts airflow side 214 and does not contact non-airflow side 216. Blocker door 200 further includes a drag link housing 410 that is configured to be coupled to a drag link 202. Drag link 202 may be coupled to a fixed structure 208 via a drag link fitting.

In response to translating sleeve 206 deploying (i.e., moving aft relative to fixed structure 208, translating sleeve 206 is deployed in FIG. 3 and stowed in FIG. 2), drag link 202 applies a force to blocker door 200, causing a portion of blocker door 200 to pivot towards fixed structure 208, as shown in FIG. 3. As a result, blocker door 200 partially blocks the flow of air through bypass air duct 250 and redirects a portion of the flow through a plurality of cascades 210, as indicated by arrow 218, which turn the flow of air in a reverse direction. With reference now to FIGS. 1, 2 and 3, thrust reverser 130 may include a plurality of blocker doors and cascades positioned circumferentially about centerline 105, as is known by those of skill in this art.

With reference now to FIG. 4, an embodiment of a new blocker door design made with a new construction method is illustrated by blocker door 200 which may include a skeletal, structural frame 400 and a front sheet 402. In various embodiments, structural frame 400 may comprise aluminum or an aluminum alloy and/or other metals and in various embodiments may be formed using die casting, machining, additive manufacturing or the like. Structural frame 400 may be temperature resistant and structurally stiff such that it retains its shape in response to being subjected to relatively high temperatures and forces. Structural frame 400 may by itself have the necessary load carrying capability to resist all the loads that the blocker door 200 is expected to experience, without relying upon any of the strength gained through combining its structure with front sheet 402 or other components. Structural frame 400 is ideally made as a unitary metallic component, and die casting may be an especially effective manufacturing method. Structural frame 400 constitutes a plurality of relatively thin, intersecting, and interconnected rib members. At least one rib member 470 may extend generally continuously along and generally adjacent to the top of blocker door 200 from one side to the other, and at least another rib member 472 may extend generally continuously along and generally adjacent to the bottom of blocker door 200 from one side to the other. Also, at least two rib members 474 and 476 may extend generally continuously from the top of blocker door 200 to the bottom of blocker door 200, interconnecting the top rib member 470 and the bottom rib member 472.

Structural frame 400 may include a plurality of tabs 406 including, for example, tab 406A and tab 406B. Front sheet 402 may be positioned on airflow side 214 of structural frame 400 and may be coupled to structural frame 400 at a plurality of coupling locations 404 including coupling location 404A and coupling location 404B. In various embodiments, one or more coupling locations 404 may be positioned at tabs 406. In various embodiments, structural frame 400 may be coupled to front sheet 402 using rivets through coupling locations 404 and tabs 406. In various embodiments, the rivets may comprise aluminum.

Structural frame 400 may define a plurality of areas between its ribs including a top area 412, a middle area 414, a lower left area 416 and a lower right area 418. Ribs of structural frame 400 may separate and enclose or define each area 412, 414, 416 and 418. With brief reference now to FIGS. 4 and 7, a core assembly 601 may be positioned substantially inside of top area 412, middle area 414, lower left area 416 and lower right area 418.

In various embodiments, at least a portion of the surface of front sheet 402 may be perforated with perforations 460 (only a few of which are illustrated in FIG. 4). The perforations 460 of front sheet 402 may allow sound to pass through front sheet 402 to the chambers in the core assembly 601, to attenuate sound in a known fashion. In various embodiments, front sheet 402 may constitute a fiber reinforced composite, possibly a laminar composite, which could be formed in a closed die molding type of process or through other processes. Front sheet 402 may also be made from sheet metals or other materials. In various embodiments, the plurality of perforations 460 may be pressed into front sheet 402, or could be formed through other methods.

With reference now to FIG. 4, structural frame 400 may define or include hinge lugs 408A and 408B which may be integrally formed with the rib members or separately attached. Blocker door 200 may be coupled to translating sleeve 206 via hinge joints using hinge lugs 408A and 408B, allowing blocker door 200 to remain coupled to translating sleeve 206 and rotate with respect to translating sleeve 206. Structural frame 400 may also define drag link housing 410 which may be integrally formed with the rib members or separately attached. Drag link housing 410 may help locate and attach drag link 202 to structural frame 400 with a hinge joint. In various embodiments, hinge lugs 408A and 408B, drag link housing 410 and structural frame 400 may all be formed by casting, such as investment casting or die casting using a single die.

Figure 5:
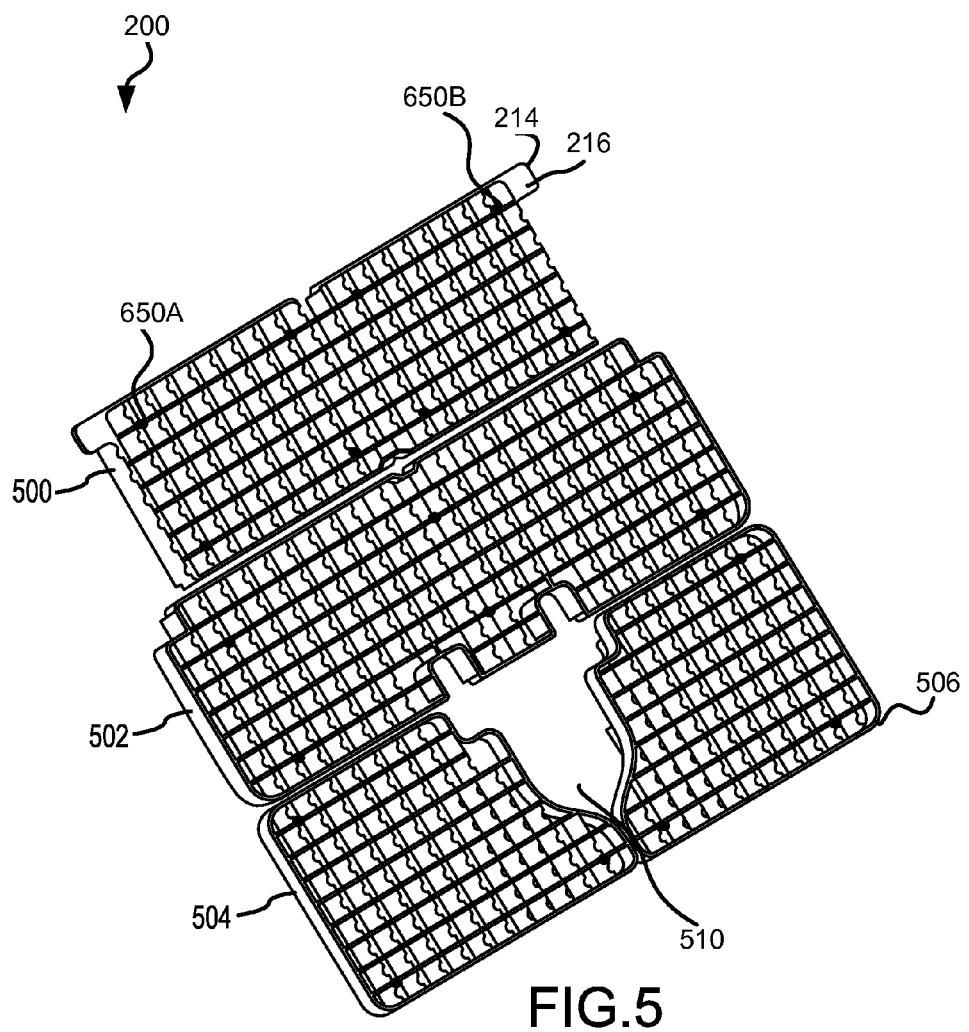
FIG. 5 illustrates acoustic cores for use in a blocker door in accordance with various embodiments.
Figure 7:
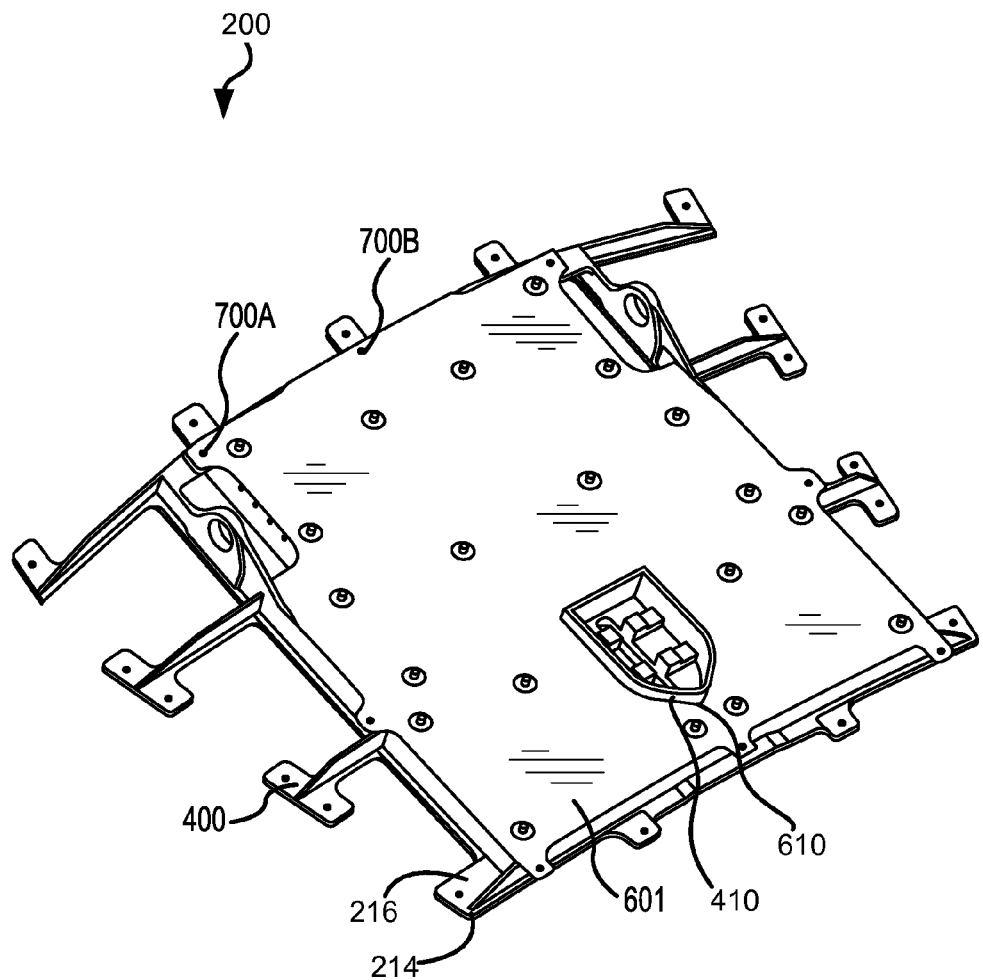
FIG. 7 illustrates the core assembly of FIG. 6B coupled to the structural frame of FIG. 4 in accordance with various embodiments.

With brief reference to FIGS. 5 and 7, core assembly 601 may include acoustic cores including a top core 500, a middle core 502, a bottom left core 504 and a bottom right core 506. Each of the acoustic cores may be capable of helping to form resonating chambers used in attenuating sound. In various embodiments and with reference to FIG. 5, each of the acoustic cores may be manufactured via injection molding, die casting, machining, additive manufacturing or the like and may be constructed from a plastic material such as a thermoplastic or thermoset. For example and in various embodiments, each of the acoustic cores may comprise polyether ether ketone (PEEK), polyphenylene sulfide (PPS) or the like. In various embodiments, each of the acoustic cores may be manufactured using a single injection mold or may be manufactured using separate injection molds for one or more of the acoustic cores.

With reference now to FIGS. 4 and 5, middle core 502, bottom left core 504, and bottom right core 506 may define an opening 510. When the acoustic cores are to be coupled to structural frame 400, opening 510 may align with drag link housing 410 such that drag link housing 410 may extend through opening 510.

Figure 6A:
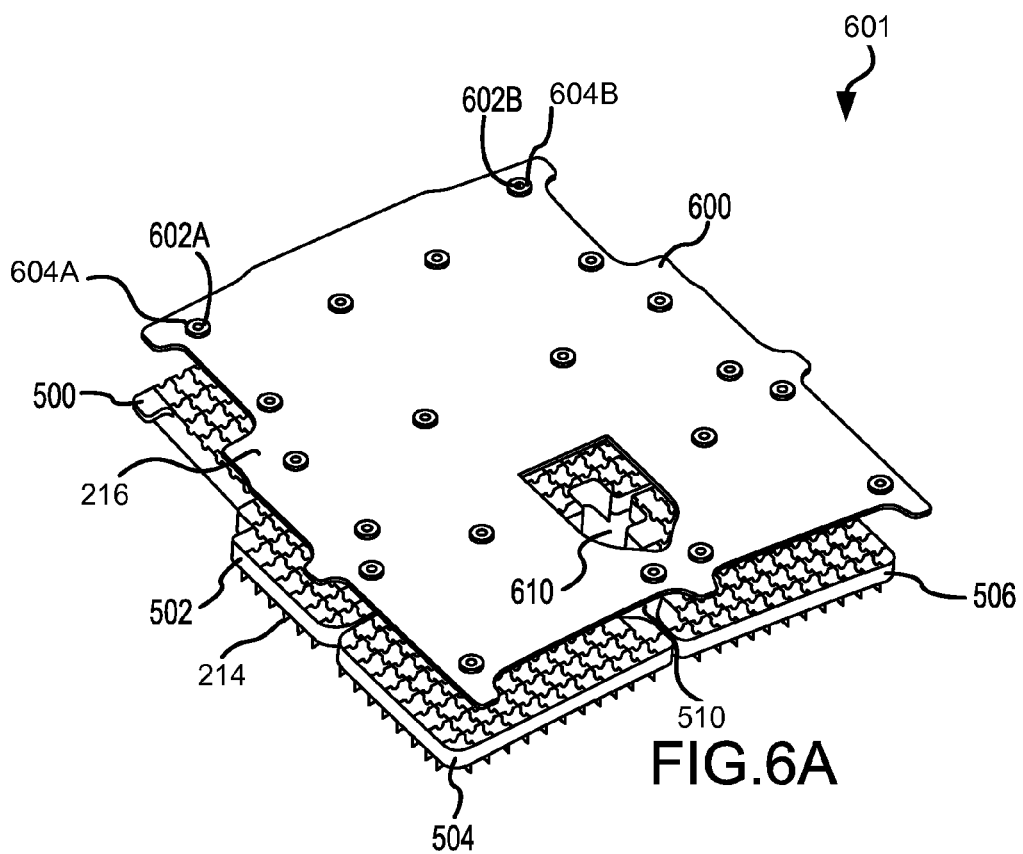
FIG. 6A illustrates a backskin and the acoustic cores of FIG. 5 in accordance with various embodiments.

With reference now to FIG. 6A, core assembly 601 may include a backskin 600 that is mechanically coupled to the acoustic cores or optionally unitarily formed therewith. If uniformly formed, backskin 600 and several or all of the cores 500, 502, 504, 506 could be injection molded or die cast. If separately formed and then mechanically attached, backskin 600 may also be made by injection molding, or by machining, casting (such as investment casting or die casting), additive manufacturing or the like. Backskin 600 may be formed from a laminar fiber reinforced composite material such as carbon, fiberglass or a para-aramid synthetic fiber (also known as Kevlar™, available from DuPont of Wilmington, Del.) bonded using an epoxy or other thermoset or a thermoplastic. If separately formed from the cores, backskin 600 might advantageously be formed from a laminar composite in a closed-die type forming process. In various embodiments, backskin 600 may or may not comprise the same material as the acoustic cores. Backskin 600 may define an opening 610 that aligns with opening 510 in response to backskin 600 being coupled to the acoustic cores. Backskin 600 may also include a plurality of openings 602, including opening 602A and opening 602B, and a plurality of washer surfaces 604, including washer surface 604A and washer surface 604B. Washer surface 604A may extend from backskin 600 towards non-airflow side 216 and may surround and define opening 602A.

Figure 6B:
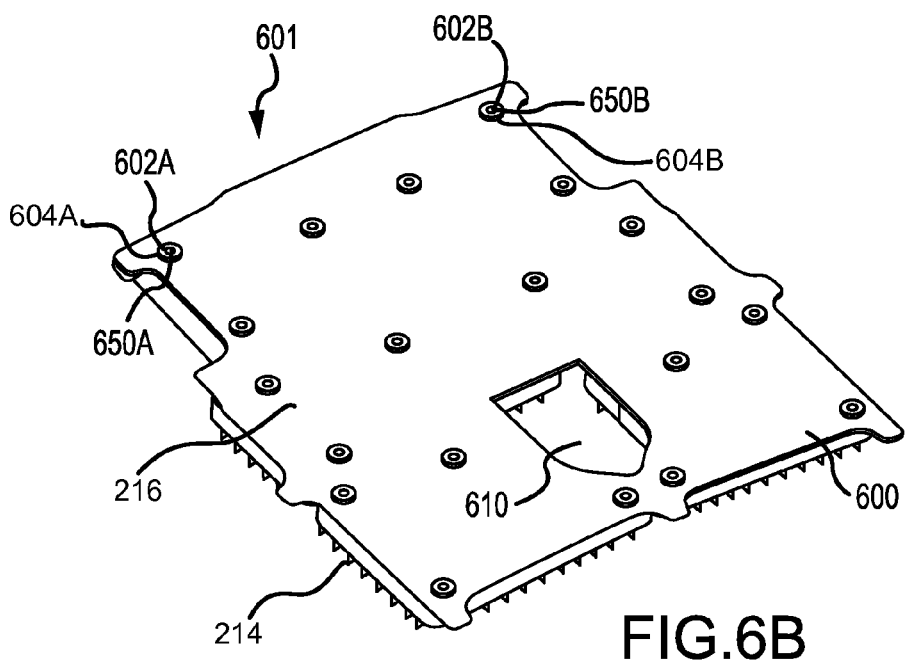
FIG. 6B illustrates a core assembly including the backskin and the acoustic cores of FIG. 6A in a coupled configuration in accordance with various embodiments.

With reference now to FIGS. 5 and 6B, the acoustic cores may include a plurality of heat stakes 650, including heat stake 650A and heat stake 650B. The plurality of heat stakes 650 may extend away from the acoustic cores towards non-airflow side 216. In response to backskin 600 being positioned on the acoustic cores, the plurality of heat stakes 650 may extend through the plurality of openings 602. The plurality of heat stakes 650 may then be heated until the plurality of heat stakes 650 and the plurality of washer surfaces 604 soften and join together. Stated differently, the acoustic cores and backskin 600 may be coupled by welding, as the plurality of heat stakes 650 are welded to the plurality of openings 602 and/or the plurality of washer surfaces 604.

With reference now to FIG. 7, core assembly 601 may be coupled to structural frame 400. In response to structural frame 400 being coupled to core assembly 601, drag link housing 410 may extend through opening 610.

Core assembly 601 may be coupled to structural frame 400 at a plurality of coupling locations 700A including coupling location 700A and coupling location 700B. In various embodiments, structural frame 400 and core assembly 601 may be coupled using rivets, such as aluminum rivets, in the plurality of coupling locations 700. In various embodiments, core assembly 601 may be positioned on non-airflow side 216 of structural frame 400.

Figure 8:
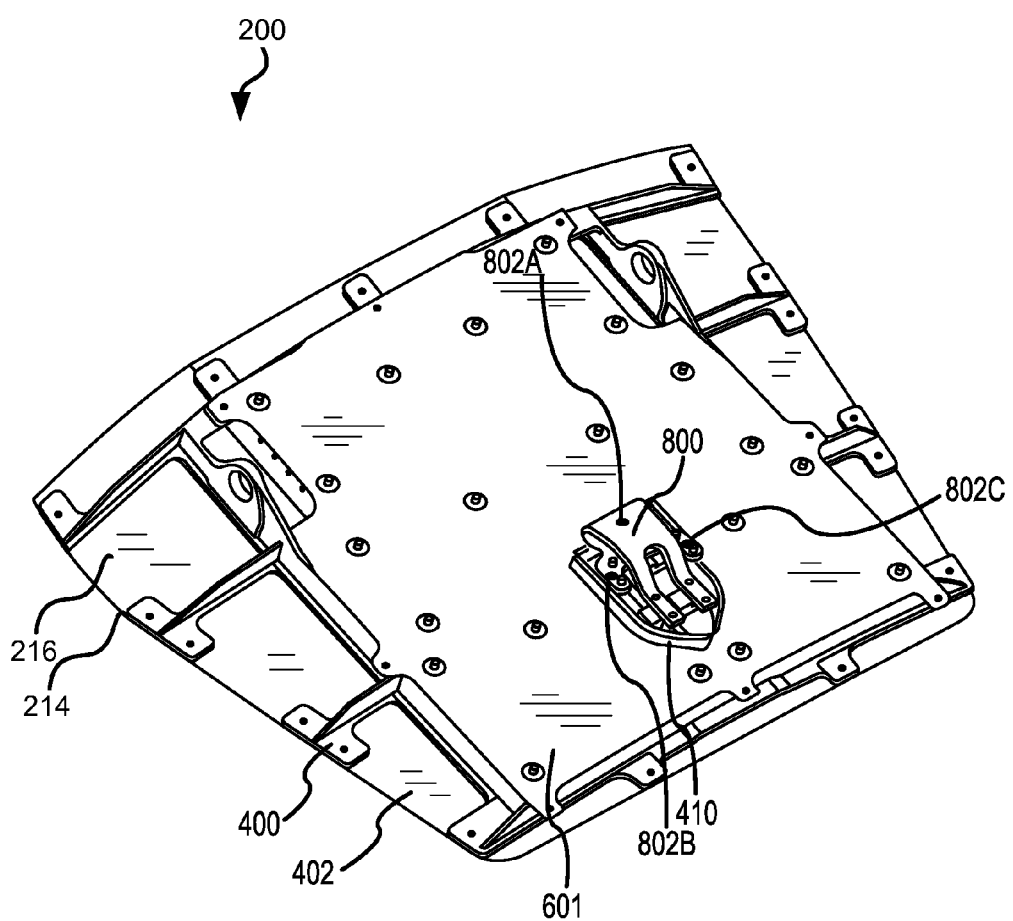
FIG. 8 illustrates the core assembly and the structural frame of FIG. 7 coupled to the front sheet of FIG. 4 in accordance with various embodiments.

With reference now to FIG. 8 and in various embodiments, blocker door 200 may include a spring 800 (part of the hinge connection between blocker door 200 and drag link 202) coupled to core assembly 601, structural frame 400, backskin 600 and/or front sheet 402 at a plurality of coupling locations 802, including a coupling location 802A, a coupling location 802B, and a coupling location 802C. In various embodiments, spring 800 may be coupled to backskin 600 and structural frame 400 and not to core assembly 601 and/or front sheet 402. Selection of components to which spring 800 is coupled is determined based on a trade-off between a desire to have more fasteners securing front sheet 402 to structural frame 400 (when spring 800 is coupled to all components) versus a desire to have fewer fasteners on the airflow side of blocker door 200 (thus reducing drag when blocker door 200 is stowed).

In various embodiments, spring 800 may be coupled to core assembly 601, structural frame 400 and/or front sheet 402 using a combination of a threaded fastener consisting of a threaded pin and a threaded collar (such as a Hi-Lok™, available from Lisi Aerospace of Paris, France) at each of the plurality of coupling locations 802 such that the threaded fasteners extend from non-airflow side 216 of spring 800 through core assembly 601, structural frame 400 and through front sheet 402. In various embodiments, spring 800 may be formed by machining, forming, casting (such as investment casting or die casting) or additive manufacturing and in various embodiments may include aluminum.

Blocker door 200 provides advantages over traditional blocker doors. With reference now to FIG. 6B, core assembly 601 is less expensive to form than a traditional core assembly as each of the core parts can be manufactured using injection molding or additive manufacturing. Front sheet 402 and backskin 600 may be cut from metal sheet stock, formed of composites in a closed die process, or injection molded.

Additionally, conventional hinge lugs and drag link housings are manufactured separately from the other components of the blocker doors and are later coupled to the blocker doors. By forming hinge lugs 408A and 408B and drag link housing 410 as part of structural frame 400, the additional time consuming and expensive step of separately making these pieces and coupling each of them to the proper place on the blocker door can be eliminated.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blocker door for use in a thrust reverser portion of a nacelle, the blocker door comprising:
    a structural frame having a plurality of connected and crossing ribs;
    a front sheet positioned on an airflow side of and attached to the structural frame via rivets; and
    at least one acoustic core positioned between the ribs of the structural frame, coupled to the structural frame via fasteners, and formed from a plastic material.

2. The blocker door of claim 1, wherein the at least one acoustic core is formed by injection molding.

3. The blocker door of claim 1, further comprising a backskin coupled to a non-airflow side of the at least one acoustic core, the backskin mechanically attached to the structural frame.

4. The blocker door of claim 1, wherein the structural frame defines at least one integral hinge lug.

5. The blocker door of claim 1, wherein the structural frame defines an integral drag link housing.

6. The blocker door of claim 1, wherein the structural frame is coupled to the front sheet via fasteners.

7. The blocker door of claim 1, wherein the structural frame is formed from a cast metal.

8. The blocker door of claim 1, wherein the front sheet defines a plurality of perforations that are punched into the front sheet.

9. A blocker door for use in a thrust reverser portion of a nacelle, the blocker door comprising:
    a structural frame defining at least one hinge lug and a drag link housing and having a plurality of connected and crossing ribs;
    a front sheet coupled to the structural frame via rivets; and
    at least one acoustic core formed using a plastic material, positioned between the ribs of the structural frame, and coupled to the structural frame via fasteners.

10. The blocker door of claim 9, wherein the at least one acoustic core comprises at least one of a thermoplastic or a thermoset.

11. The blocker door of claim 9, wherein the structural frame comprises aluminum or an aluminum alloy.

12. The blocker door of claim 9, wherein the structural frame is formed from a cast metal.

13. The blocker door of claim 9, wherein the at least one acoustic core is formed using injection molding.

14. The blocker door of claim 9, further comprising a backskin coupled to the at least one acoustic core.

15. A blocker door for use in a thrust reverser portion of a nacelle, the blocker door comprising:
    a structural frame defining at least one hinge lug and a drag link housing and having a plurality of connected and crossing ribs;
    a front sheet coupled to the structural frame using rivets; and
    at least one acoustic core positioned between the ribs of the structural frame and coupled to the structural frame using fasteners.

16. The blocker door of claim 15, wherein the at least one acoustic core comprises at least one of a thermoplastic or a thermoset.

17. The blocker door of claim 15, wherein the structural frame comprises aluminum or an aluminum alloy.

18. The blocker door of claim 15, wherein the structural frame is formed from a cast metal.

19. The blocker door of claim 15, wherein the at least one acoustic core is formed using injection molding.

\* \* \* \* \*